UNITED STATES PATENT OFFICE.

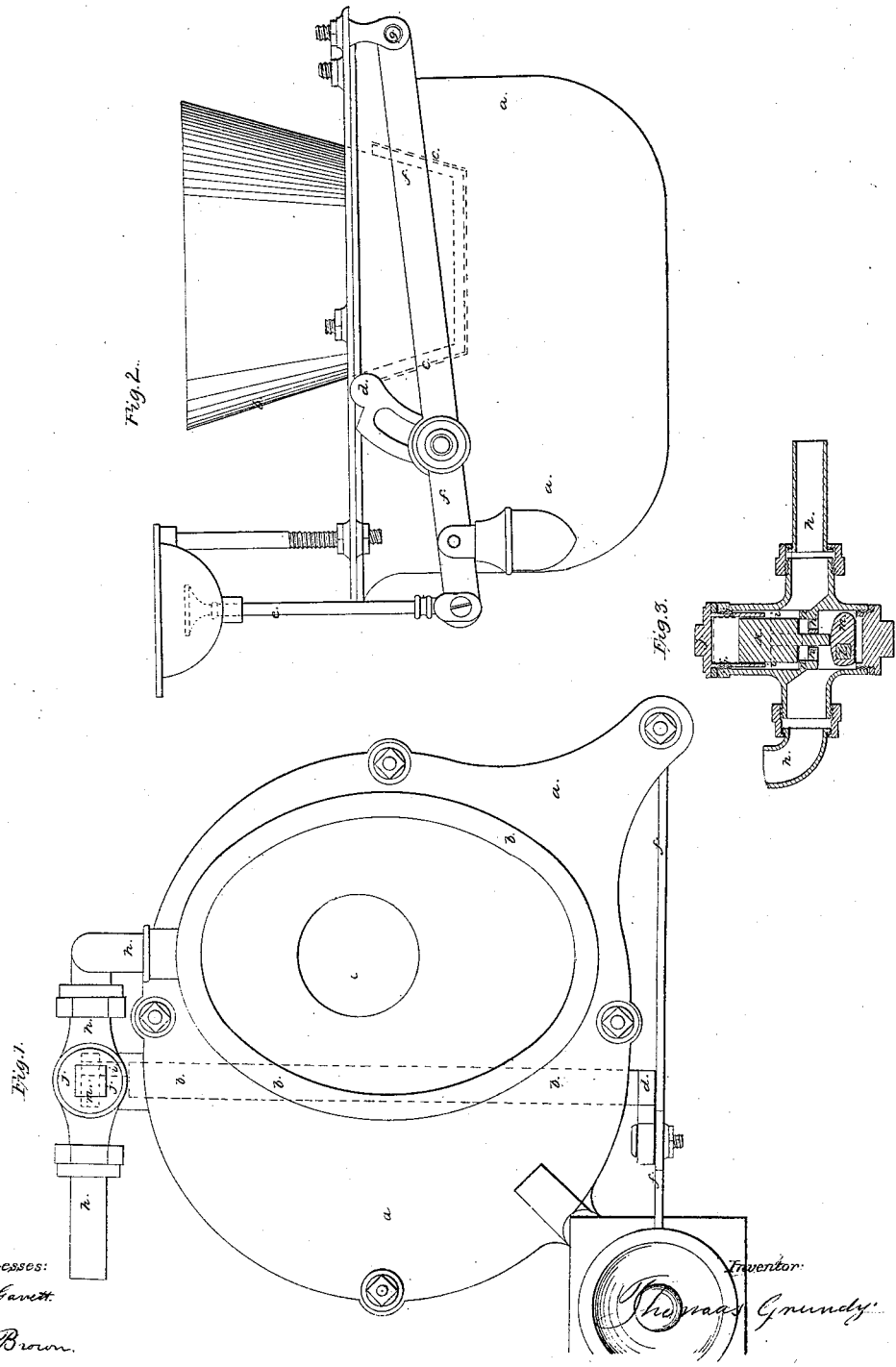
T. Grundy,
Water Closet
N° 28,853.
Patented June 26, 1860.

THOMAS GRUNDY, OF BOSTON, MASSACHUSETTS.

WATER-CLOSET.

Specification of Letters Patent No. 28,853, dated June 26, 1860.

*To all whom it may concern:*

Be it known that I, THOMAS GRUNDY, of Boston, in the county of Suffolk and State of Massachusetts, have invented certain new and useful Improvements in Water-Closets, and that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The figures of the accompanying plate of drawings represent my improvements.

Figure 1 is a plan or top view. Fig. 2 is a side elevation of the same. Fig. 3 is a view in detail.

In the operation of water-closets it is always important to keep the "pan" and the basin partially filled with clean water, but in general the "pan" is shut or closed so quickly by the dropping or lowering of the handle, that often no water is allowed to run into the basin.

To remedy this objection so as to always insure a sufficient supply of water remaining in the basin however quickly the pan may be operated, is the object of my improvement which consists in forming in the pipe that supplies the basin an air-tight chamber in which plays up and down a piston, that is raised by a cam, when the handle is elevated so as to open communication between the supply pipe and the basin, and drops slowly by its own weight so that the supply of water can not be suddenly cut off from the basin, when the handle drops or is pushed down.

$a$ $a$ in the drawings represent the outer casing of the apparatus.

$b$ $b$ represents the inner basin, $c$ $c$ the pan shown by dotted lines in Fig. 2 turning on a hinge at $d$ and operated in the usual way by means of a handle $e$ and weight lever $f$ turning on a fulcrum at $g$.

$h$ $h$ is the supply-pipe which instead of being continuous as in the ordinary construction has formed in it a chamber $i$ $i$ containing a screw-cylinder $j$, in which is closely fitted but as to admit of playing up and down, a piston valve $k$ which opens the communication between the supply of water and the inner basin $b$ $b$, or slowly shuts off the said communication as follows: When the handle $e$ is raised, a turning rod $l$ $l$ (shown by dotted lines in Fig. 1) operates a cam, $m$, Fig. 3, that thereby abuts against a stem of the piston-valve $k$ and lifts it from its seat $n$, in the chamber $i$ $i$ and thus permits the water to rush through the supply pipe into the basin $c$ $c$ as the communication therewith will then be opened; on releasing or pushing down the handle $e$, the cam $m$ will drop into the position shown in Fig. 3 but as the piston valve $k$ is fitted closely into the air-cylinder $j$, it will drop slowly by its own weight and will not reach its seat $n$ until a sufficient supply of water has been received by the basin $c$ $c$, thus preventing the communication between the supply of water and the basin from being suddenly shut off as would otherwise be the case. The length of time which the piston valve shall occupy in falling and reaching its seat can be easily regulated and the quantity of water admitted to the basin gaged accordingly by screwing up or down, the air-cylinder $j$ which thereby increases or diminishes as the case may be, the friction surface that the piston-valve $k$ rests upon.

Having thus described my improvements what I claim as my invention and desire to have secured to me by Letters Patent, is—

The arrangement of devices herein described, the same consisting of the piston-valve $k$ playing up and down in the cylinder $j$ and operated substantially as and for the purpose specified.

THOMAS GRUNDY.

Witnesses:
JOSEPH GAVETT,
A. W. BROWN.